Sept. 22, 1970   H. P. JACKSON ET AL   3,529,482
FRICTION DISC TRANSMISSION

Filed Nov. 8, 1968  2 Sheets-Sheet 1

INVENTORS
HAROLD P. JACKSON
WALLACE A. HANSON, JR.

BY Browne, Schuyler & Beveridge

ATTORNEYS

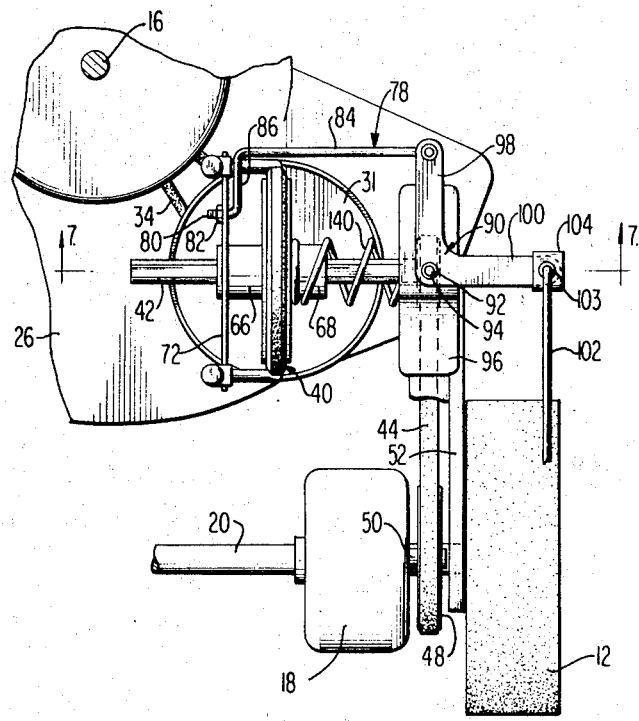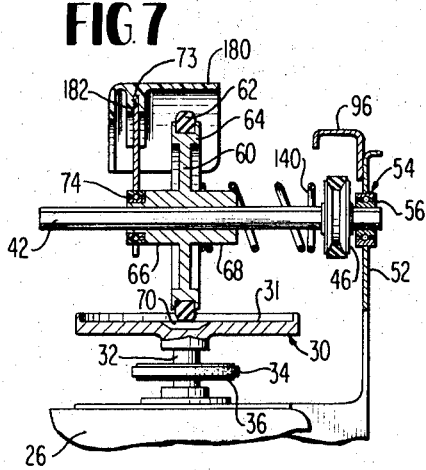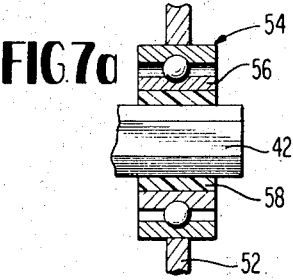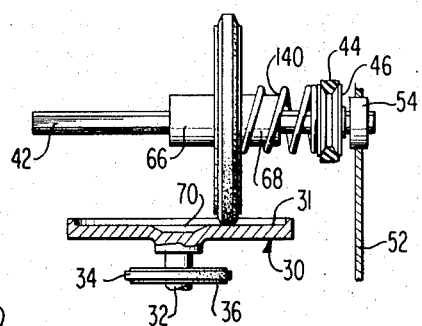

United States Patent Office 3,529,482
Patented Sept. 22, 1970

3,529,482
FRICTION DISC TRANSMISSION
Harold P. Jackson, McDonough, and Wallace A. Hanson, Jr., Riverdale, Ga., assignors to McDonough Power Equipment, Inc., McDonough, Ga.
Filed Nov. 8, 1968, Ser. No. 774,299
Int. Cl. F16c 23/00, 27/06; F16h 13/14, 15/10
U.S. Cl. 74—197
22 Claims

ABSTRACT OF THE DISCLOSURE

A friction disc transmission including a disc, a wheel driven by the disc and mounted on a shaft to drive the shaft at different speeds depending on the positioning of the wheel on the disc. The shaft is resiliently mounted for movement towards and away from the disc through a ball bearing assembly including a flexible sleeve positioned between the inner race of the bearing and the end of the shaft. The opposite end of the shaft is received through a yoke member connected to the wheel for shifting the wheel along the shaft to obtain different speeds. When the wheel is moved through the center of the disc to obtain a reverse speed, a spring received about the shaft is energized to urge the wheel towards a neutral position overlying the center of the disc, should the wheel be released by the shifting mechanism when the wheel is in the reverse speed position. The shifting mechanism is operatively connected to the yoke to move the same and consequently the wheel along the shaft to obtain the different speeds. The yoke is supported with respect to a stationary element by self-adjusting pivot arms which permit the yoke to move along the shaft for changing speed.

SUMMARY OF THE INVENTION AND OBJECTS

The present invention relates to a new and improved friction disc transmission particularly suitable for use in power lawn mowers although not limited thereto.

One of the objects of the present invention is to provide a friction disc transmission having an improved construction which will effectively operate over long periods of repeated and rugged use.

A further object of the invention is to provide such a friction disc transmission which has a compact and relatively economical construction highly suitable for use in power lawn mowers.

A still further object is the provision of such a friction disc transmission which may be easily adjusted by an operator to provide various forward or reverse speeds.

Another object of the present invention is the provision of such a friction disc transmission which automatically is biased to a neutral position when the transmission is in the reverse speed mode and the operator releases the shift control.

In one embodiment, the above objects are achieved by a transmission including a friction disc driven from a suitable source such as a gasoline engine on a power lawn mower, a wheel having its periphery in engagement with the friction disc to be driven thereby, and a driven shaft keyed to the wheel to be driven thereby and in turn drive the wheels of the mower through a pulley system.

To reduce wear between the wheel and the disc as well as to absorb vibration and shock during operation, the shaft is mounted in a resilient bearing which permits the shaft to pivot about a fulcrum at the bearing towards and away from the friction disc. The bearing includes inner and outer races with ball bearings therebetween, and a flexible sleeve positioned between the inner race and the shaft to provide the flexibility.

Changes of speed are obtained by shifting the wheel along the shaft to place the wheel at different points along the radius of the disc. When the wheel is engaged on one side of the disc, forward positions are achieved and when engaged on the opposite side, a reverse speed position is achieved. In the center of the disc, a central depression is formed such that when the wheel is over the depression, no contact exists between the wheel and disc thus providing a neutral position.

Shifting of the wheel along the shaft into the various speed positions on the disc is achieved through a yoke slidably mounted on the shaft and operatively connected to the wheel to move the same along the shaft. Actuation of the yoke along the shaft is through a connecting rod secured to the yoke and extending parallel to the shaft to be reciprocable by a crank which in turn is operated by a control rod extending upwardly and rearwardly along the handle of the mower. The control rod is operated through a hand lever pivoted on a bracket secured to the handle of the mower. The crank is mounted for pivotal movement with respect to a fixed bracket secured above the mower housing; pivoting of the crank being achieved through movement of the control rod by the hand lever. The pivot assemblies at connections between the crank and control rod and the latter and the hand lever include nylon bearing sleeves for reducing friction and wear.

The bracket for the operating handle is provided with several notches which releasably detain the handle in the various forward speed positions of the wheel as well as the neutral position. However, as a safety feature, no such notch is provided for the reverse speed position and moreover a biasing mechanism is provided to bias the wheel into the neutral position from the reverse speed position. Thus, should the operator release the handle when the transmission is in the reverse speed position, the biasing mechanism will automatically return the wheel to the neutral position in order to prevent or minimize injury through inadvertent reverse movement of the mower. In one specific embodiment the biasing mechanism includes a coil spring positioned about the shaft on the side opposite the yoke to be compressed only when the wheel is in the reverse speed position.

The yoke is supported in proper alignment on the drive shaft by a pair of arms, the lower ends of which are pivotally mounted to a fixed base plate on the mower housing while the arm upper ends are pivotally connected to the opposite ends of the yoke respectively. These support arms are formed in two pieces each including a lower piece which is pivoted with respect to the base plate and an upper piece slidable over the lower piece while being pivotally connected to one of the ends of the yoke. Thus, when the yoke moves along the shaft in shifting the wheel between the various speed positions, the arms will pivot about the base plate with the upper arm pieces sliding relative to the lower arm pieces to accommodate movement of the yoke.

To insure the wheel will be maintained in contact with the disc, a pair of springs are respectively secured to the yoke ends to bias the yoke and consequently the wheel downwardly towards the friction disc. In addition, the springs also bias the upper pieces of the yoke arms downwardly along the lower pieces inasmuch as the yoke is connected to the upper arm pieces.

Nylon bearing sleeves are provided about the opposite ends of the yoke to be received in the upper pieces of the arms to minimize friction and wear. Similar sleeves are provided at the lower pivots of the arms. To cover the wheel, a shield is secured on the yoke in overlying relation to the wheel. The shield may be removed to expose the wheel for inspection or repair.

Other objects and advantages of the present invention will become apparent from the following detailed description in conjunction with the attached drawings in which:

FIG. 6 is a plan view of the transmission with portions of the mower removed for clarity;

FIG. 7 is a cross-sectional view taken generally along lines 7—7 of FIG. 6 and additionally including a shield element covering certain parts of the transmission;

FIG. 7a is an enlarged detail view of a portion of FIG. 7 illustrating a bearing assembly; and FIG. 8 is a view similar to FIG. 7 but with only certain portions shown in cross-sections and with the transmission in a reverse position.

DETAILED DESCRIPTION

Figure 1:
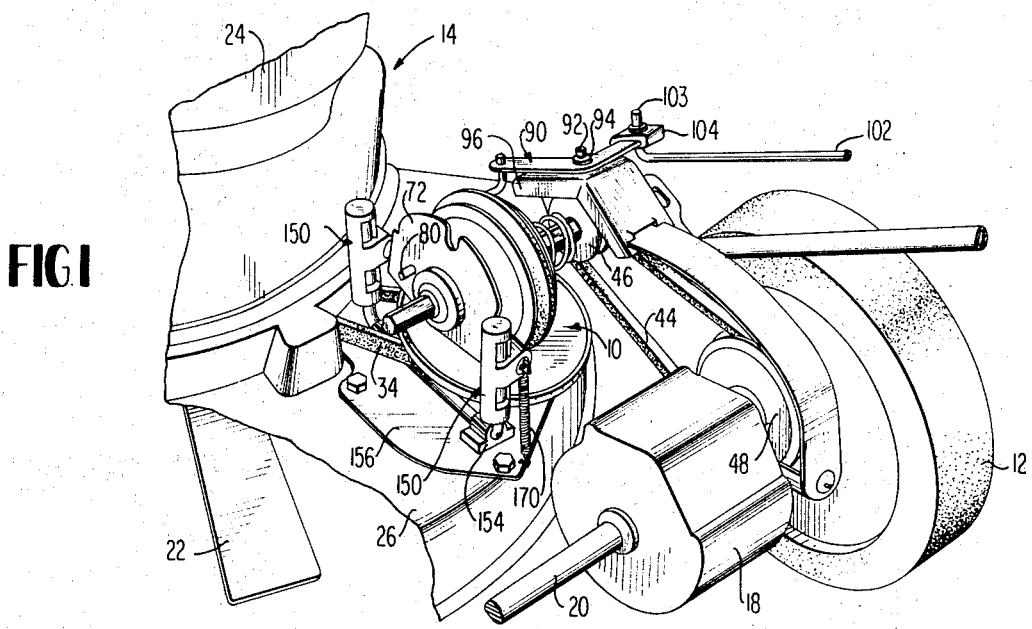
FIG. 1 is a perspective view of a transmission embodying the invention shown mounted on a lawn mower housing with portions of the latter broken away.

Referring to the drawings in detail and initially to FIG. 1, there is shown for illustrative purposes only a friction disc transmission generally designated 10 embodying the invention employed to drive the wheels 12 of a power lawn mower 14. The lawn mower structure apart from the transmission forms no part of the present invention but is covered in copending U.S. patent application Ser. No. 712,407 filed Mar. 12, 1968 which is owned by the same assignee of the subject application. In the specific form shown, transmission 10 functions to transmit driving torque from the mower blade shaft 16 (see FIG. 6) to the rear wheels 12 of the mower. In addition, a differential generally designated 18 is incorporated in the rear wheel axle 20, with transmission 10 connected to drive the differential. Blade shaft 16 is employed to rotate the grass cutting blade 22 under the power of a conventional gasoline engine generally designated 24. Further details of the mower exclusive of the transmission may be found in the above identified copending U.S. application.

The shown transmission 10 includes a drive disc 30 disposed in a horizontal plane above the mower housing 26 and mounted for rotation about a vertical axis by means of a shaft 32 suitably journalled in mower housing 26. Rotation of a disc 30 is achieved through a pulley belt 34 trained about a pulley 36 keyed to shaft 32 and a pulley (not shown) keyed to blade shaft 16. Operation of gasoline engine 26 to rotate cutting blade 22 will also cause disc 30 to rotate by virtue of the belt and pulley connection 34, 36. The top surface 31 of friction disc 30 forms a friction surface for transmitting motion of the friction disc to a friction wheel 40 in typical fashion. Friction wheel 40 is keyed to a drive shaft 42 for rotation therewith to drive shaft 42 as the wheel is being driven by engagement on friction surface 31. Shaft 42 extend generally parallel to friction surface 31 of the friction disc and is spaced therefrom so that the periphery of the wheel will engage the friction disc with the plane of the wheel extending substantially perpendicular to the plane of the friction disc. Rotation of drive shaft 42 is transmitted to differential 18 to ultimately drive rear wheels 12 of the mower through a pulley belt 44 trained about pulleys 46 and 48 respectively secured to drive shaft 42 and the input shaft 50 of the differential.

Referring to FIGS 6 and 7a, drive shaft 42 is mounted with respect to the mower housing by a bracket 52 and a ball bearing 54 mounted in bracket 52 to receive the end of drive shaft 42. Between shaft 42 and the inner race 56 of bearing 54, a resilient sleeve 58 is interposed to permit shaft 42 to undergo pivotal movement towards and away from friction disc 30 about a fulcrum generally located at the bearing 54. Drive shaft 42 is thus flexibly mounted to allow it to absorb vibration and shock during operation of the mower as well as to minimize the frictional wear on the wheel. In addition, the flexible mounting of drive shaft 42 facilitates shifting of wheel 40 along the drive shaft into various positions on the friction disc to change speeds as will be further described.

In the preferred embodiment, wheel 40 includes a metallic rim portion 60 and a resilient rubber or plastic peripheral ring portion 62 received between flanges 64 on the rim (as shown in FIG. 7) for contacting the friction surface of the disc. From opposite sides of the wheel project a pair of concentric hubs 66 and 68 rigidly fixed to wheel rim 60 to rotate with the wheel. The internal passages of hubs 66 and 68 are formed with a hexagonal cross section to rotate drive shaft 42 while being slidable along the drive shaft which is similarly formed with a hexagonal cross-section.

Figure 5:
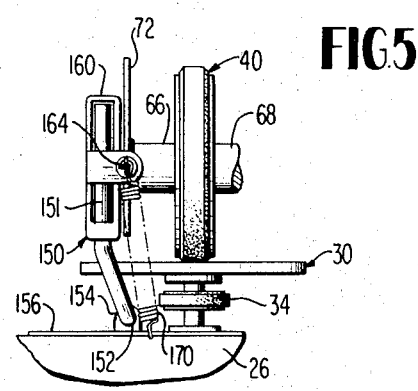
FIG. 5 is a view similar to FIG. 4 but when the transmission is in vertical position.
Figure 4:
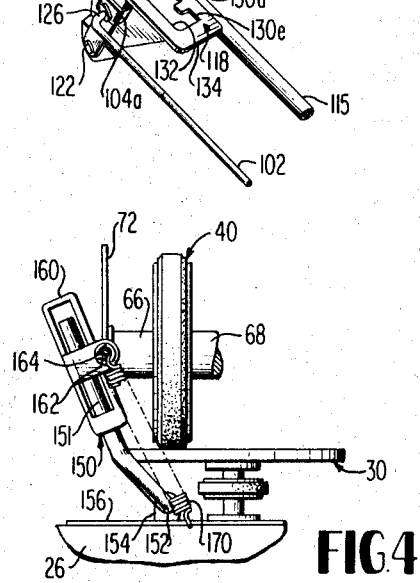
FIG. 4 is an elevational view of the transmission taken from the rear of the mower when the transmission is in one of its forward speed positions.

Changes in speed are obtained by moving wheel 40 along shaft 42 to radially spaced positions on friction disc 30. At the outer positions on disc 30, wheel 40 will rotate at greater speeds than the inner positions on the disc. Also, the forward speed positions are on one side of the center of disc 30 as illustrated in FIG. 4 while reverse speed positions are on the opposite side as illustrated in FIG. 8. Neutral position of the wheel in which no motion is transmitted, is achieved by moving the wheel to overlie the center of disc 30 as shown in FIGS. 5 and 7. In the preferred embodiment, the center of the disc is formed with a depression 70 so that there will be no contact between the wheel and the disc in the neutral position.

Actuation of the wheel along drive shaft 42 to obtain the various desired speeds is achieved through a yoke member generally designated 72 connected to wheel hub 66 for slidable movement along shaft 42. In the specific form, yoke member 72 is formed from a flat metallic plate having an aperture which receives and is aligned with hub 66. Hub 66 is rotatable in yoke aperture through means of a bearing 74. However bearing 74 is secured with respect to hub 66 and yoke 72 so that they are movable together along shaft 42 for purposes of changing speeds.

Actuation of yoke member 72 along shaft 42 to shift the wheel is achieved through a shift mechanism including a connecting rod 78 having its extremity 80 fixed to the yoke member such as by the nut and screw assembly 82 as shown in FIG. 6. Connecting rod 78 further includes a main portion 84 extending parallel to end portion 80 as well as shaft 42, and a crank portion 86 extending perpendicular to shaft 42 and interconnecting the end and main portions 80 and 84.

Connecting rod 78 is reciprocable in a path parallel to drive shaft 42 to reciprocate yoke member 72 as desired for changing speed. For this purpose, a generally L-shape crank 90 is mounted for oscillatory movement about a pivot 92 secured by a nut 94 in a secondary bracket 96 which in turn is secured to main bracket 52. Crank 90 has a flat shape and extends in an oblique plane with the extremity of the other crank leg 98 being pivotally connected to connecting rod 78 and the extremity of the other crank leg 100 being pivotally connected to control rod 102.

Figure 3:
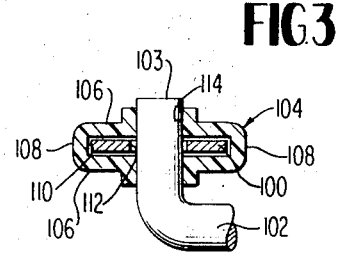
FIG. 3 is a detail view in cross-section illustrating a pivot assembly employed in the shift mechanism associated with the transmission.

In the preferred embodiment, a sleeve 104 is employed to reduce friction and wear at the pivotal connection between crank leg 100 and control rod 102. Sleeve 104 has a generally rectangular outline including opposite parallel walls 106 interconnected by parallel end walls 108 as shown in FIG. 3. Rectangular passage 110 formed in sleeve 104 by walls 106, 108 corresponds to the cross section of crank leg 100 so as to receive the same as shown in FIG. 3. The lower end 103 of control rod 102 projects upwardly for receipt through aligned apertures 112 and 114 extending through crank leg 100 and the opposite side walls 106 of sleeve 104. Preferably, sleeve apertures 114 have a slightly smaller diameter than aperture 112 in crank leg 100 so that end 103 of the control rod engages the sleeve. In this manner, friction forces are transmitted from end 103 of the control rod to the sleeve which in turn distributes the forces to the crank leg to avoid wear at the pivotal connection.

Figure 2:
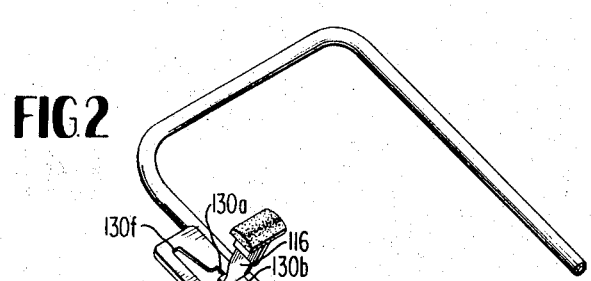
FIG. 2 is a fragmental perspective view of a portion of the handle of the lawn mower illustrating a hand lever for shifting the transmission.

It will be seen that by moving control rod 102 generally along its longitudinal axis, crank 90 will pivot about pin 92 to move connecting rod 78 and in turn yoke member 72 and wheel 40 to obtain the desired speed. Control rod 102 extends upwardly along the handle 115 of the mower for actuation by an operating handle or hand lever 116 which is pivotally mounted in a bracket 118 secured to the mower handle as illustrated in FIG. 2. Bracket 118 includes a vertical wall 119 fixed by bolt and nut assemblies (not shown) to two spaced points along mower handle 115. Operating handle 116 is pivoted to the lower end of bracket wall 119 by a bolt 122 extending through an aperture in bracket wall 119 and secured by a nut (not shown). The upper end 126 of control rod 102 projects laterally and is pivotally received through an aperture formed in the operating handle intermediate the ends of the latter. A sleeve 104a similar to 104 described above, is employed to reduce wear at the pivotal connection between control rod 102 and operating handle 116. Extremity 126 of control rod 102 is maintained in operating lever against axial movement by means of a cotter pin (not shown).

In the shown embodiment, provision is made for releasably detaining wheel 40 in four forward speed positions on disc 30 as well as the neutral position. This is achieved by five notches 130a, 130b, 130c, 130d and 130e formed along one side of an elongated aperture 132. These notches are formed in a flange 134 of bracket 118 to receive the upper stem portion of operating handle 116. Notch 130a determines the neutral position. Notch 130e which is farthest from the neutral position notch 130a, will of course provide the greatest forward speed. Movement of operating handle from the neutral notch 130a in the opposite direction to the end 130f of aperture 132 will shift the wheel across the central depression 70 in disc 30 to provide a reverse speed.

As a safety provision, no notches are provided to detain wheel 40 in the reverse speed position.

Moreover a biasing mechanism is employed to urge wheel 40 towards the neutral position from the reverse position. With this feature, should the operator accidentally or otherwise release operating handle 116 from the reverse speed position 130f, the biasing mechanism will automatically move wheel 40 to the neutral position to disengage the mower wheels from the transmission.

In the specific form shown, this biasing mechanism includes a coil spring 140 received about drive shaft 42 and wheel hub 68 on the side opposite yoke member 72. Spring 140 is dimensioned such that in the forward speed positions of wheel 49 the spring will be relaxed as it will be spaced from pulley 46 as shown in FIG. 7. However, when wheel 40 is moved across center depression 70 of disc 30 into the reverse speed position shown in FIG. 8, wheel 40 will force spring 140 against pulley 46 to compress and thus energize the spring. Consequently, if operating handle 116 is released from the reverse position, spring 140 will automatically move wheel 40 over depression 70 in the disc to disengage the drive. In the preferred embodiment shown, one end of the spring 140 is received in a mounting aperture (not shown) in the rim of wheel 40 while the other end of the spring is free.

Referring now to FIGS. 1, 4 and 5, a mounting mechanism is provided to insure that yoke number 72 is properly aligned on drive shaft 42 for actuating wheel 40. This mechanism includes a pair of yoke arms 150 located on opposite sides of the yoke member where they are pivotally connected at their lower ends with respect to the mower housing for movement about an axis extending at right angles to drive shaft 42. In the form shown, arms 150 may be interconnected by an integral cross member 152 which is journalled in upstanding portions 154 of a base plate 156 fixed to the top of the mower housing as shown. In addition, nylon bushings are preferably employed in upstanding base portions 154 around cross member 152 to reduce friction and wear. Arms 150 have slidable upper portions 160 telescopingly received over the lower arm portions 151 for slidable movement therealong. Upper arm portions 160 are pivotally connected to the opposite ends of yoke member 72 respectively to cause the arms to pivot about their lower ends when the yoke member moves along drive shaft 42. In the specific form shown, upper arm portions 160 are formed with transverse passages 162 on one side thereof which receive the opposite extremities of the yoke member. In addition, nylon bushings 164 are secured about the yoke extremities for receipt in the arm passages 162 to minimize friction and wear.

It will be seen that as yoke member 72 is moved along shaft 42 by connecting rod 78 to shift the position of wheel 40, the connection of the yoke member to arms 150 will cause the arms to pivot to move with the yoke while insuring that the yoke is properly aligned along shaft 42. In addition, the upper parts 160 of the arms 150 will move along the lower arm parts to accommodate the increase or decrease in the distance between the lower pivotal axis of the arms and the opposite ends of the yoke. In the illustrated embodiment, when the wheel is in neutral position on the disc, arms 150 will extend generally vertically. However when the wheel moves to either side of the neutral position the upper arm portions 160 will move slightly upwardly relative to the lower arm portions to accommodate movement of the yoke member. In addition to properly supporting the yoke member, arms 150 also serve as an added mounting for drive shaft 42.

In order to insure effective frictional engagement between wheel 40 and disc 30, a spring mechanism is employed which in the shown embodiment includes a pair of tension springs 170 whose lower ends are anchored to base plate 156 and upper ends are connected to the opposite ends of the yoke member which are received in the upper arm passages 162. Springs 170 exert a downward bias on the yoke member thus also urging shaft 42 and wheel 40 downwardly towards the friction disc. In addition, springs 170 urge the upper portions 160 of the yoke arms downwardly on the lower arm portions.

In order to prevent accidental contact with wheel 40, a shield 180 is fixed to the yoke member to overlie and cover the wheel as shown in FIG. 7. In the specific form illustrated, shield 180 has a curved plastic construction including an elongated internal arcuate groove 182 dimensioned to tightly fit over the upper edge 73 of the yoke member. Shield 180 may be easily removed from the yoke member for purposes of inspection or repair by merely pulling the shield upwardly to disengage groove 182 from the upper edge 73 of the yoke member.

Modifications readily apparent from the foregoing description and associated drawings, although not specifically mentioned herein, will nevertheless be included within the spirit and scope of the invention as indicated in the appended claims.

What is claimed is:

1. A friction disc transmission comprising in combination; a friction drive disc having a friction surface rotatable about a first axis, a driven shaft, means mounting said driven shaft to extend generally parallel to said friction surface and for rotation about a second axis generally perpendicular to said first axis, a driven wheel to be driven by engagement of its periphery against said friction disc, means mounting said driven wheel on said shaft for rotation with said shaft about said second axis to drive the shaft, shift means for moving said wheel over said friction surface into various speed positions, said means mounting said shaft including resilient means located generally at one end of said shaft and allowing said shaft to pivot in a direction towards or away from said friction surface about a fulcrum located generally at said resilient means.

2. The transmission defined in claim 1 wherein said means mounting said shaft comprises a ball bearing including an inner race and an outer race located generally around said one end of said shaft, and wherein said resilient means includes a flexible sleeve located around the shaft between the latter and the inner race.

3. The transmission defined in claim 1 further including spring means urging the wheel downwardly into engagement with said friction surface.

4. The transmission defined in claim 1 wherein said wheel is movable along said shaft for adjusting the speed transmitted, said shaft means for moving the wheel for changing speed includes a yoke member movable along the shaft and being operatively connected to said wheel to move the wheel along the shaft; and wherein there is further included a mounting arm having one end pivotally connected to said yoke, pivot means pivotally connecting the opposite end of said arm to a fixed element such that the arm is pivotable about an axis extending generally parallel to the plane of said friction surface and perpendicular to said second axis whereby upon movement of said wheel into various positions along said friction surface said arm will move with the yoke by pivoting about said pivot means while also moving relative to said yoke.

5. The transmission defined in claim 4 wherein said arm includes a lower portion pivoted by said pivot means and an upper portion slidable on said first portion and being pivotally connected to said yoke, and wherein there is further included spring means biasing said yoke and wheel toward said friction surface while also biasing said upper portion of said arm along said lower portion toward said pivot means.

6. The transmission defined in claim 4 wherein said shift means for moving said wheel over the friction surface further includes a connecting rod connected to said yoke to move the yoke axially along said shaft, said rod including portions extending generally parallel to said shaft, a crank having opposite angularly projecting legs, first pivot means mounting said crank for movement about an axis extending perpendicularly to the plane of the crank between said legs thereof, second pivot means interconnecting one leg of said crank to said connecting rod to move the rod upon pivoting of said crank, a control rod, and third pivot means pivotally connecting said control rod to the other leg of said crank to pivot the crank.

7. The transmission defined in claim 6 wherein said third pivot means includes a low friction sleeve received over said other leg of the crank, aligned apertures extending through said sleeve, other crank leg and control rod, and a pivot pin extending through said aligned apertures.

8. The transmission defined in claim 1 wherein said driven wheel is movable into various forward and reverse speed positions on opposite sides of the center of said friction surface, and wherein there is further included yieldable means urging said driven wheel to a neutral position generally overlying the center of said friction surface when the driven wheel is in a reverse speed position.

9. The transmission defined in claim 1 wherein the opposite end of said shaft is free of support.

10. A friction disc transmission comprising in combination, a friction disc rotatable about a first axis, a shaft to be driven by the friction disc, means resiliently mounting said shaft in generally parallel relationship to said disc to permit limited movement of said shaft towards and away from said disc, a wheel to be driven by said disc, means mounting said wheel on said shaft for movement with the shaft to drive the same and for movement along the shaft into various speed positions in engagement with said friction disc, means for shifting said wheel along the shaft to change the speed transmitted to the wheel including a yoke member mounted for slidable movement along the shaft on one said of said wheel, said yoke member being operatively connected to said wheel to move the same along said shaft, mounting means for the yoke including an arm having one end pivotally connected to said yoke and an opposite end pivotally connected with respect to a fixed element such that movement of the yoke along the shaft causes the arm to pivot, and actuating means independent of said arm for moving the yoke along the shaft and in turn said wheel along the shaft to change the speed transmitted to said wheel.

11. The transmission defined in claim 10 further including a shield, and means releasably securing said shield to said yoke to cover portions of said wheel.

12. The transmission defined in claim 10 further including means pivotally connecting said arm to said yoke, the pivot means including a low friction bearing sleeve received about one end of said yoke and passage means formed in the arm receiving said bearing sleeve for rotation.

13. The transmission defined in claim 10 further including a pair of said arms pivotally mounted to fixed elements on opposite sides of said yoke and shaft, said arms being pivotally connected to opposite end portions of said yoke respectively.

14. The transmission defined in claim 13 wherein said arms each include lower portions and upper portions slidably mounted on said lower portions with the lower portions being pivotally connected with respect to the fixed elements and the upper portions being pivotally connected with respect to the opposite ends of said yoke respectively, and wherein is further provided spring means urging said yoke, shaft and wheel towards said friction disc to maintain the wheel on the disc and also urging said upper arm portions on said lower arm portions.

15. A friction disc transmission comprising in combination; a friction drive disc having a friction surface rotatable about a first axis, a driven shaft, means mounting said driven shaft to extend generally parallel to said friction surface and for rotation about a second axis generlly perpendicular to said first axis, a driven wheel to be driven by engagement of its periphery against said friction disc, means mounting said driven wheel on said shaft for rotation therewith about said second axis to drive the shaft and for movement between various forward and reverse speed positions on opposite sides of said first axis for changing the speed and direction transmitted to the driven wheel by the friction disc, shift means for moving said wheel into the various forward and reverse speed positions, and yieldable means urging said driven wheel to a neutral position generally overlying the center of said friction surface when the driven wheel is in the reverse speed position.

16. The transmission defined in claim 15 wherein said yieldable means includes a coil spring located about said shaft on one side of the wheel with one end of said spring engaging the wheel and the opposite end of said spring adapted to engage on abutment when the wheel is in the reverse speed position.

17. A friction disc transmission comprising in combination, a friction disc rotatable about a first axis, a shaft to be driven by the friction disc, means mounting said shaft in generally parallel relationship to said disc to permit limited movement of said shaft towards and away from said disc, a wheel to be driven by said disc, means mounting said wheel on said shaft for rotational movement with the shaft to drive the same and for movement along the shaft into various speed positions in engagement with said friction disc, means for shifting said wheel along the shaft to change the speed transmitted to the wheel including a yoke member mounted for slidable movement along the shaft on one side of said wheel, said yoke member being operatively connected to said wheel to move the same along said shaft, mounting means for the yoke including an arm having one end pivotally connected to said yoke and an opposite end pivotally connected with respect to a fixed element such that movement of the yoke along the shaft causes the arm to pivot, and actuating means for moving the yoke along the shaft and in turn said wheel along the shaft to change the speed transmitted to said wheel, said arm including a lower portion pivoted with respect to said fixed element, and an upper portion slidable on said lower portion and pivotally connected with respect to said yoke such that upon movement of the yoke along the shaft said upper arm portion will slide along said lower arm portion while pivoting with said lower arm portion.

18. The transmission defined in claim 17 further including a spring means urging said yoke together with said shaft and wheel downwardly towards said friction disc and also urging said upper arm portion downwardly along said lower arm portion.

19. The transmission defined in claim 18 wherein said shaft mounting means further includes a ball bearing located generally at one end of said shaft on the side opposite said yoke, said ball bearing including an inner race, and a resilient sleeve positioned between said inner race and said shaft to permit said shaft to pivot towards and away from said disc about a fulcrum located generally at the bearing.

20. In a friction disc transmission including a friction disc having a friction surface, a shaft mounted for rotation in a plane generally parallel to the friction surface of said disc, a wheel mounted on the shaft to drive the same in rotation, the periphery of said wheel being in engagement with the friction surface of said disc to be rotated thereby, means for moving the wheel radially over the surface of said disc to change the speed transmitted from said disc to said shaft comprising a yoke operatively connected to the wheel to move the wheel in the axial direction of the wheel along the friction surface of said disc, an actuating member extending generally in the longitudinal direction of said shaft and having one end connected to said yoke to move the same over the friction surface of said disc, means for reciprocating said actuating member for moving the wheel over the surface of said disc; and a mounting means for said yoke comprising at least one arm having one end pivotally connected to the yoke and an opposite end pivotally connected to a fixed element.

21. The combination defined in claim 20 wherein said arm includes a lower portion pivoted to said fixed element and an upper portion slidable on said lower portion and pivoted to said yoke.

22. The combination defined in claim 20 further including a pivotable crank having a first arm pivotally connected to said actuating member to reciprocate the same upon pivoting of the crank, and a second arm adapted to be connected to a control rod for pivoting the crank.

References Cited
UNITED STATES PATENTS

| | | | |
|---|---|---|---|
| 844,011 | 2/1907 | Fischer | 74—197 |
| 844,863 | 2/1907 | Groesbeck | 74—197 |
| 1,209,492 | 12/1916 | Power | 74—197 XR |
| 3,107,946 | 10/1963 | Drake | 308—26 XR |
| 3,327,546 | 6/1967 | Gordon | 74—194 |

JAMES A. WONG, Primary Examiner

U.S. Cl. X.R.

74—209; 308—26, 72